(12) United States Patent
Karmakar et al.

(10) Patent No.: US 8,045,236 B2
(45) Date of Patent: Oct. 25, 2011

(54) APPARATUS, AND ASSOCIATED METHOD, FOR FACILITATING BACKGROUND PROCESSING OF PUSH CONTENT

(75) Inventors: Srimantee Karmakar, Mississauga (CA); Michael Matovsky, Toronto (CA); Brindusa Fritsch, Etobicoke (CA); Viera Bibr, Kilbride (CA); Kamen Vitanov, Mississauga (CA); Michael Shenfield, Richmond Hill (CA)

(73) Assignee: Research in Motion Limited, Waterloo (CA)

( * ) Notice: Subject to any disclaimer, the term of this patent is extended or adjusted under 35 U.S.C. 154(b) by 1050 days.

(21) Appl. No.: 11/392,432

(22) Filed: Mar. 29, 2006

(65) Prior Publication Data

US 2007/0239884 A1 Oct. 11, 2007

(51) Int. Cl.
*H04N 1/21* (2006.01)
*H04W 4/00* (2009.01)
(52) U.S. Cl. ........................................ 358/296; 455/433
(58) Field of Classification Search .................. 358/296, 358/1.15, 1.13, 1.14; 455/433, 410, 509, 455/517, 522, 426.1, 434, 411, 408; 370/335, 370/395.21, 235, 329, 344, 338, 466; 726/2, 4; 709/232, 201, 221, 224, 225
See application file for complete search history.

(56) References Cited

U.S. PATENT DOCUMENTS

| 2002/0027673 | A1* | 3/2002 | Roosen et al. | 358/1.13 |
| 2003/0093476 | A1* | 5/2003 | Syed | 709/204 |
| 2006/0230154 | A1* | 10/2006 | Nguyenphu et al. | 709/227 |
| 2007/0036145 | A1* | 2/2007 | Riley et al. | 370/352 |
| 2008/0097771 | A1* | 4/2008 | Flom et al. | 705/1 |

FOREIGN PATENT DOCUMENTS

EP 1335564 A2 8/2003

* cited by examiner

*Primary Examiner* — Saeid Ebrahimi Dehkordy

(57) ABSTRACT

Apparatus, and an associated method, for a communication device operable pursuant to a push content communication scheme. An instruction detector detects a message containing a instruction by which to operate upon push content. The message is, for instance, generated by a mobile station at which an application associated with the content is resident. Once detected by the instruction detector, a content operator operates upon the content in a manner corresponding to the instruction contained in the detected message. Once operated upon, the content is stored at a storage element, available when an application of which the content is associated, becomes active.

18 Claims, 6 Drawing Sheets

APPARATUS, AND ASSOCIATED METHOD, FOR FACILITATING BACKGROUND PROCESSING OF PUSH CONTENT

The present invention relates generally to a manner by which to facilitate the processing of push content, communicated pursuant to a push content scheme. More particularly, the present invention relates to apparatus, and an associated method, for background processing of the push content communicated pursuant to the push content scheme in a mobile, or other, communication system.

Background processing is performed upon the content at, e.g., a proxy server, prior to pushing the content associated with an application to the mobile station and, e.g., at the mobile station. The background processing is performed responsive to an instruction to perform the background processing, and the rules pursuant to which the background processing is performed are provided in a message delivered to the location at which the background processing is performed. By background processing the content, communication delays that otherwise would occur waiting for an application to be in an active state are obviated.

BACKGROUND OF THE INVENTION

Many new types of communication systems have been made possible as a result of technological advancements in communication technologies. Mobile communications, for instance, have exhibited significant growth and mobile communication systems have been developed, deployed, and popularly used by many. Both telephonic and data communications are effectuable by way of a mobile communication system. While first used primarily for communication of short messages, such as e-mail messages, increasingly, the mobile communication systems are constructed to be capable of effectuating data communications to carry out data-intensive communication services and applications.

Push-message services, for instance, are provided in some data communication systems, including mobile communication systems. The communication of data pursuant to a push message service is advantageous in that the content that is communicated is caused to be delivered to a receiving communication device without particular action taken by the receiving communication device, or its user, to retrieve the content. When the content is pushed to the receiving communication device, its delivery is more timely than when communicated in a conventional request-response type of communication scheme. In such a scheme, communication of the content is delayed until a request is made by the receiving communication device for the delivery of the content.

Various proposals are under consideration by which to standardize various aspects of push content communications and additional proposals are solicited. For instance, the Open Mobile Alliance (OMA) Limited is promulgating a standardization document entitled, "Dynamic Content Delivery Requirements". The document pertains, in part, to requirements and protocols associated with content for communication in a mobile communication system. The content delivery scheme pertains to various network technologies. And, in various aspects, the content delivery scheme is intended to enable an application and to provide for asynchronous push content.

Processing is required to be performed upon the content. Processing of the content requires time for its performance and completion. The processing time period is dependent, in part, upon the amount of content that is to be processed and upon the type and amount of processing that is to be performed upon content. The processing time required to process content is, if extensive, noticeable and deleteriously affects communication performance or a user's perception of the communication performance.

While background processing, i.e., processing operations performed when an application is inactive, is generally known, its implementation with respect to content communicated in a push content communication scheme, has not fully been investigated.

An improved manner by which better to provide for background processing of content communicated in a push content communication scheme is, therefore, needed.

It is in light of this background information related to the communication of push content that the significant improvements of the present invention have evolved.

DETAILED DESCRIPTION

Figure 1:
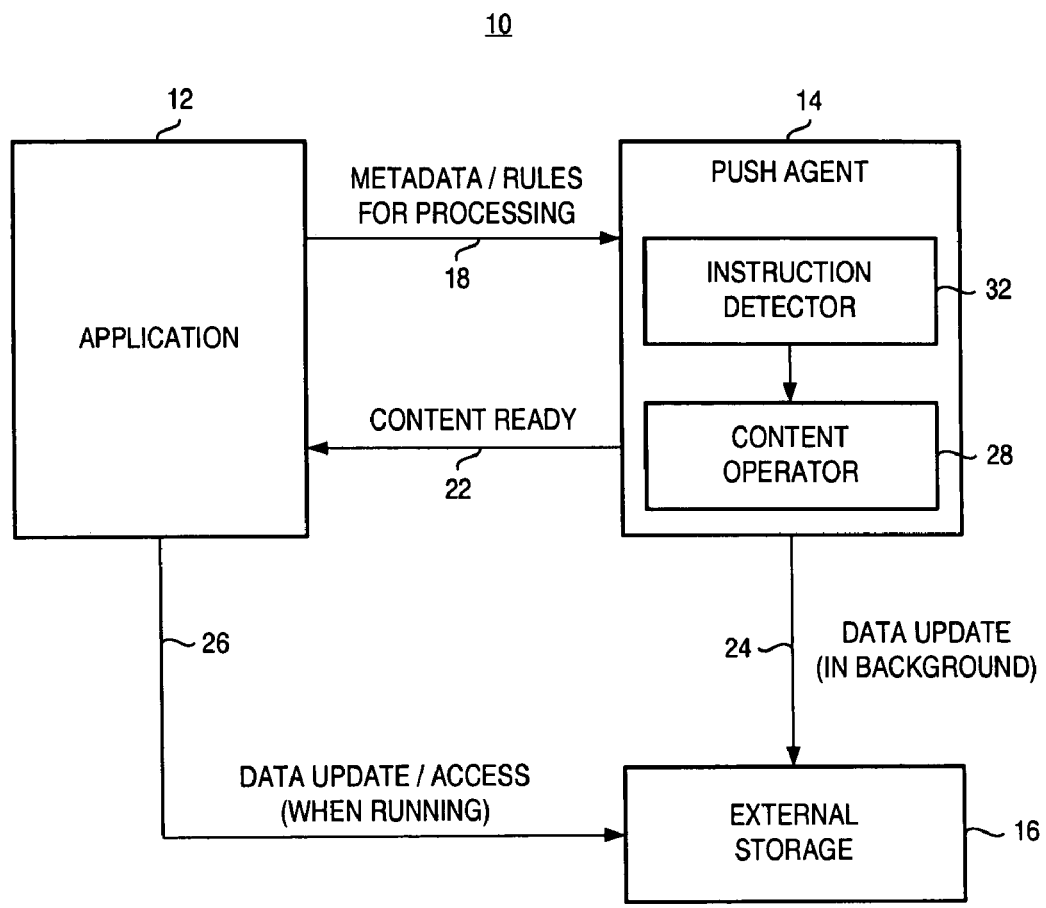
FIG. 1 illustrates a functional block diagram showing elements of an embodiment of the present invention.

The present invention, accordingly, advantageously provides apparatus, and an associated manner, by which to facilitate the processing of push content, communicated pursuant to a push content scheme.

Through operation of an embodiment of the present invention, a manner is provided by which to perform background processing on push content communicated to a push content scheme in a mobile, or other, communication system.

In one aspect of the present invention, background processing is performed upon the content at, e.g., a proxy server, prior to pushing the content to the mobile station. The background processing is performed in response to an instruction. Background processing is also performable upon the content at a mobile station, once the content is pushed thereto without requiring the application with which the content is associated to be active.

In one implementation, processing rules used at the proxy server or other server side entity pursuant to background processing are contained as part of the push content. The push proxy agent extracts the rules for background processing at the proxy.

An application provisioned at the mobile station, in one implementation, has a corresponding server side part that is deployed at the proxy. The server side application dictates the background processing rules to the proxy push agent.

In another implementation, the application on the mobile station dictates rules to a client push agent embodied at the mobile station. These contain both client side and server side rules. The client push agent forwards the server side rules to the proxy push agent. In a further implementation, the rules are influenced by mobile station user preferences, provided, e.g., by inputs via a user interface entered by a user of the mobile station. Again, server side rules are forwarded to the proxy push agent.

Various combinations of such implementations are also possible. For example, in one implementation, the server side part of the application is deployed at the proxy. And, in one implementation, the client side application directly communicates the server side processing rules to the server side application. The rules are, e.g., generic across all push content subscribers. Or, the rules are customized server side rules.

The instruction responsive to which the processing is performed provides instructions regarding the performance of the background processing and the rules pursuant to which the background processing is performed. The instruction is provided to the location at which the background processing is performed, such as, e.g., at the proxy server, at the mobile station, or at another logical device.

By providing for the background processing of the content at the server side, an application need not be active for the processing of the content. Processing of content, which otherwise would be delayed until the application with which the content is associated, is performed as a background operation, and the processing of the data, if already completed, prior to the application becoming active, is ready for use by the application without further delay.

In another aspect of the present invention, the background processing is performed according to a rule, or set of rules, delivered to the background processor or location at which the background processing is performed. The background processor is formed, for instance, at a push agent implemented as a client push agent at the mobile station and as a proxy push agent at the proxy. In one embodiment, the processing rules by which the background processing is performed are determined by message definitions defined at development time. In another embodiment, the rules are determined dynamically at run time from the content of the message. When defined by message definitions at development time, statically defined rules are provided. When, in contrast, dynamically defined rules are provided, the rules are contained as part of the push content or, alternately, dictated by the application.

In one implementation, the background processor is formed at, or forms, a push agent. And, the message containing metadata or rules by which processing is to be performed is sent to the push agent from the application with which the push content is associated. The processing is performed upon the push content prior to storing, processing instructions/ metadata embedded in the content, and application notification interface. The push agent notifies the application that the content is ready. In one implementation, the data that is to be updated on the client is identified by a unique key in the message. The unique key forms, e.g., a predefined XML tag or an ID (identification) for a data record, or other such message content used for purposes of identification.

In these and other aspects, therefore, apparatus, and an associated method, is provided for a communication device operable pursuant to a push content communication scheme. A content operator is adapted to receive content communicated pursuant to the push content communication scheme. The content operator is configured to operate upon the content in an instructed manner as a background operation. An instruction detector is adapted to receive content metadata. The content metadata, also referred to herein as content processing metadata, defines an instructed manner by which the content is to operate upon the content. The instruction detector is configured to instruct the content operator of the content metadata.

In operation, content processing metadata defines an instructed manner by which to operate upon the content. Then, operations are performed upon the content in the instructed manner as a background operation. By providing for the background processing of the content, an application need not be active for the processing of the content. Processing of content, which otherwise would be delayed until an application with which the content is associated, is performed as a background operation. And, the processing of the data, if already completed prior to the application becoming active, is ready for use by the application without further delay.

Referring first, therefore, to FIG. 1, an assembly, shown generally at 10, represents elements involved in operation of an embodiment of the present invention by which background processing is performed upon content. The elements comprising the assembly 10 are implementable in any desired manner and positionable at any desired physical entity of a mobile communication system.

Here, the assembly is shown to include an application 12, a push agent 14, and a storage entity 16. The respective elements 12, 14, and 16, are selectably positionable in communication connectivity, indicated by way of the segments 18, 22, 24, and 26. The application 12, in the exemplary implementation that shall be described herein below, is embodied at a mobile station of a mobile communication system. The push agent, a dynamic content delivery client 14, is, e.g., embodied at a network device as a proxy push agent, such as at a proxy server forming a push agent. The push agent is, in one implementation, or alternately, positioned at a mobile station as a client push agent, or elsewhere at a communication network. And, the storage entity 16, in one exemplary implementation, is also network-positioned, such as together with the push agent at a proxy server or external to the proxy server at another network location and, in another exemplary implementation, positioned at the mobile station.

The push agent, wheresoever positioned, receives messages, here represented by way of the segment 18. The message forms, or includes, metadata or rules pursuant to which background processing is to be performed in a background mode of operation. The client is here represented to include a content operator 28 and an instruction detector 32. The content operator and instruction detector are functional entities, also implementable in any desired manner.

The instruction detector operates to detect a message communicated thereto, here represented by, or by way of, the line 18. The message detected by the detector, in the exemplary implementation, directly contains the rules for metadata pursuant to which the content is to be operated upon by the content operator, e.g., is of values identifying the content processing metadata. In an alternate implementation, the message includes a message ID that, when detected by the detector 32, is mapped to a message definition of a message definition set. In the exemplary implementation in which the message directly contains the metadata or rules by which the content is to be operated upon, the message forms, e.g., an XML message, a binary type message wrapped in an XML message, or other type of message. In a further implementation, the message delivered to the client and detected by the instruction detector also includes a key that identifies the data that is to be updated, i.e., operated upon. The key forms, e.g., a unique key comprised of a predefined XML tag, or an identification of a data record, etc.

In an implementation in which the application provides the push agent 14 the rules in a message sent in a beforehand manner, e.g., in a manner similar to an initial registration by the application to inform the push agent of the manner by which to background process the push content. In another implementation, the processing rules are contained as part of a message that also contains the push content.

Once detected, the instruction detector notifies the content operator 28 of the rules by which the content is to be operated upon. And, responsive thereto, the content operator operates upon the data.

Upon completion of the processing upon the content, a message is provided to the application, here represented by, or by way of, the line 22 to alert the application that the content is ready. And, the content, once processed, is stored at the storage entity 16. The storage entity is accessible by the application, here indicated by, or by way of, the line 26. The storage entity is, e.g., located at the mobile station at which the application 12 is resident, at a network entity at which the push agent is located, or at another network entity. In any event, the updated content or data is updated in a background mode of operation, obviating the need of the application to be active for the operations to be performed on the content.

Figure 2:
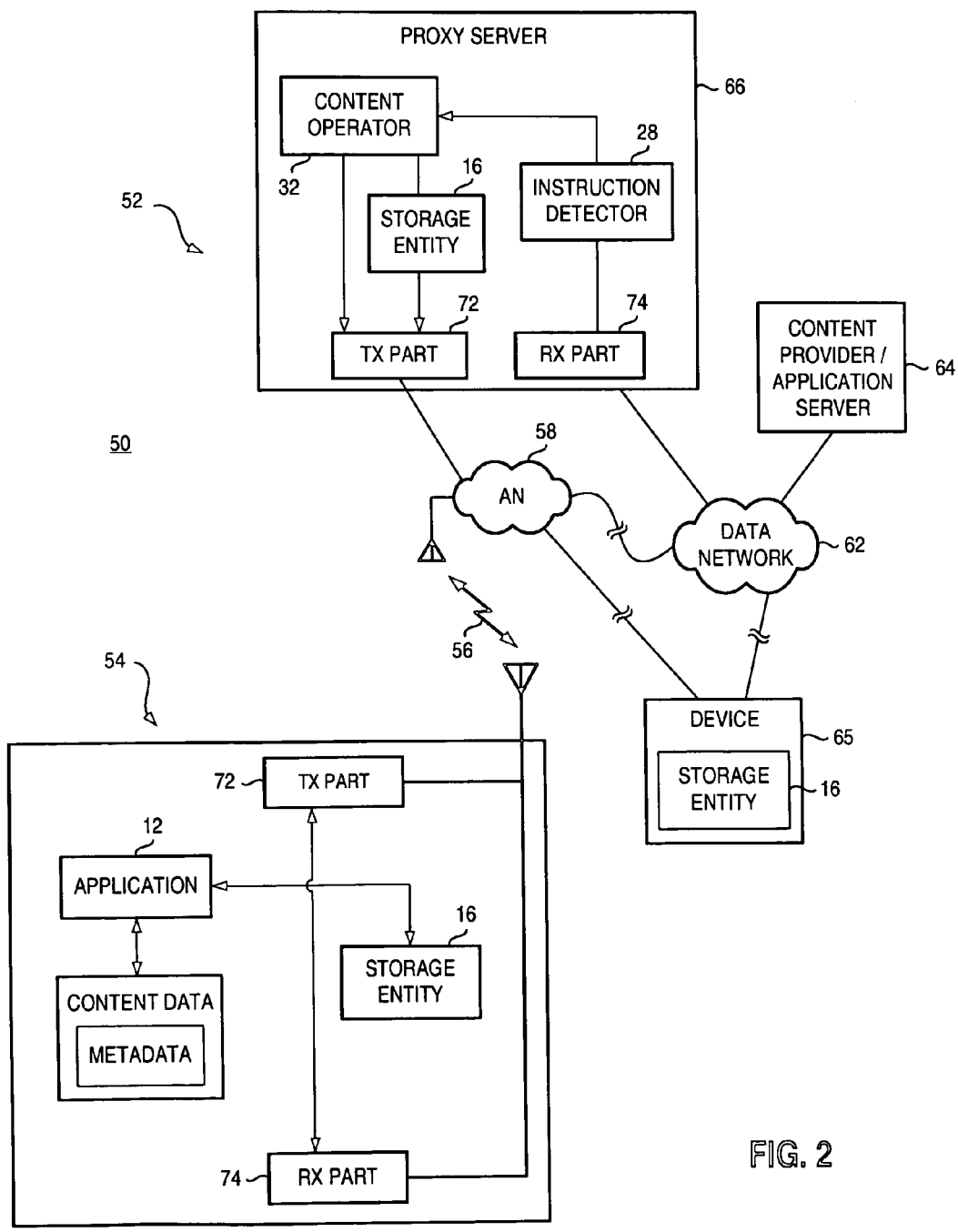
FIG. 2 illustrates a functional block diagram of a mobile communication system in which an embodiment of the present invention is operable.

Referring next to FIG. 2, a communication system, shown generally at 50, provides for radio communication between a network part 52 and a mobile station 54 by way of a radio air interface 56. In the exemplary implementation, content is communicated both by the network part to the mobile station and by the mobile station to the network part. For purposes of describing exemplary operation of an embodiment of the present invention, communication of push content originated at, or provided to, the network part to the mobile station 54 shall be described. Such description is by way of example. Communication of content by the mobile station to the network part is analogously carried out. The elements of the assembly 10 form parts of the communication system, physically embodied, in various embodiments, at various entities of the communication system 50.

The network part is here shown to include an access network (AN) 58 and a data network 62 suitably connected theretogether in communication connectivity. The data network 62 here forms a packet data network, such as the Internet, and communication devices, such as the application server 64 that contains, or generates, content, and shall, at times, herein be referred to as a content provider. Other network devices, of which the network device 65 is representative, are also connected to the networks 58 or 62. A storage entity 16 is embodied at the device 65.

The network part also includes a proxy server 66, here connected to the access network 58 and to the data network 62. Content sourced at the application server is, pursuant to conventional operation, routed to the proxy server by way of the data network. And the proxy server performs a direct wireless push to the mobile station by way of the access network and the radio air interface for subsequent forwarding on to the mobile station by way of the radio air interface 56.

Content data, herein referred to, at times, as notifications, is pushed to the mobile station to deliver the notifications to the mobile station without requiring separate requests to be made by the mobile station. The mobile station includes transceiver circuitry, here represented by a transmit part 72 and a receive part 74. The mobile station also includes an application, here shown at 12, that consumes content pushed to the mobile station. And content data 78, associated with the application and metadata 80 are further shown. And, here, a storage entity 16 is also provided at the mobile station.

The content provider embodied at, or forming, the application server 74 offers dynamic content, e.g., a push-enabled XML web service, and supports content subscription by, or on behalf of, an end-user of the mobile station 54. When content is to be communicated to a mobile station, the content provider sends the content to the proxy server 76 that, in turn, delivers the content using a notification mechanism.

The proxy server 66 interacts with external content providers, such as the content provider formed of the application server 74 and with mobile stations, such as the mobile station 54, and the applications resident thereat. In operation, the proxy server further mediates subscription and notification work flows between the content provider and the mobile station and provides miscellaneous radio optimization services, such as protocol and format transformations, scheduled delivery, temporary storage of content when a mobile station is out of communication range, broadcast services, group subscriptions, and other services. The proxy server also includes a transmit part 72 and a receive part 74. The proxy server, in an exemplary implementation, also includes a storage entity 16, as well as an instruction detector 32 and content operator 28.

In the exemplary implementation shown in the figure, the proxy server includes the content operator 28 and the instruction detector 32. As noted previously, corresponding structure is also, or alternately, implementable at the mobile station as a client push agent. The instruction detector is configured to receive messages that provide instruction of the manner by which the content operator is to operate upon content. The message, for instance, directly contains the instruction, and the instruction detector detects the instruction and provides indications thereof to the content operator. The content operator performs operations upon the content in conformity with the instructions detected by the detector. In the exemplary implementation, the message containing the instructions also identifies the content that is to be operated upon.

The content operator operates upon the content, and, when the operations are completed, the operated-upon content is ready for storage at a storage entity. Any of the storage entities 16 are available at which to store the operated-upon content. That is to say, the storage entity 16 at the proxy server, the storage entity 16 at the device 65, and the storage entity 16 at the mobile station are all available at which to store the content, once operated upon by the content operator. Once stored, the content is available for use by the application 12 when the application becomes active. The application knows from which storage unit to get the content. In one implementation, the application dictates the location of the storage as part of the processing rules. In another implementation, the push agent indicates the location of the storage to the application when the content ready signal is sent.

In an alternate embodiment, static operation is provided as an alternative to dynamic processing rules. When a background processing attribute is operated, notifications delivered to a mobile application resident at a mobile station permit update of the internal data of the application. When a notification arrives at the mobile station, the mobile application may, or alternately, may not be, running, i.e., active. If the application is running, each notification is processed when the notification arrives. And, any necessary internal data is updated and, if appropriate, content is displayed to an end user. When the application is running, foreground processing is performed in the manner just-described. A fundamental manner by which to handle notifications when the application is closed, i.e., inactive, is to queue the notifications upon their arrival. When the application is subsequently started, the application processes the notifications stored in its queue.

Through operation of the background processing attribute of an embodiment of the present invention, updates to the internal data of the application take place while the application is closed or inactive. That is to say, background processing of notifications is performed. In operation, the application is still able to release all resources when closed. By acquiring only minimal resources if and when required to process a notification in the background, the data remains continually updated and ready for the end user when the end user subsequently starts, or causes the start of, the operation.

Figure 3:
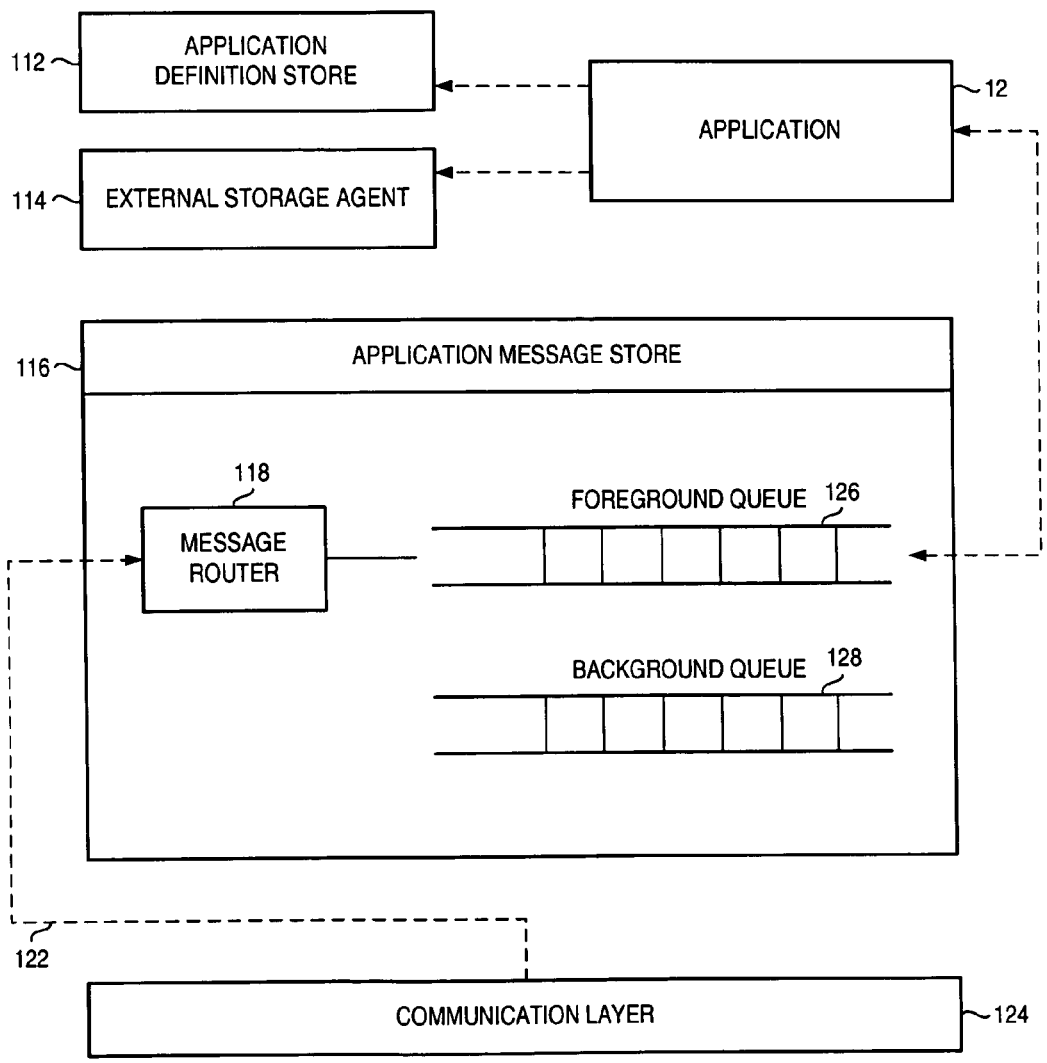
FIG. 3 illustrates a functional block diagram of portions of a communication device operable pursuant to an embodiment of the present invention.

FIG. 3 illustrates portions of the mobile station 54 shown in FIG. 2 and the application 12 forming the content client 36 thereof. The portions analogously can form parts of the network part, such as the application server 24 or the proxy server 26. Here, an application 12, an application definition store 112, an external storage agent 114, and an application message store 116 are shown. The application message store includes a message router 118 that is coupled, here represented by way of the line 122, to a communication layer 124.

The application definition store 112 contains data definitions, message definitions and executable scripts. A data definition exists for each unique data type of the application and is given a unique data identifier. The data definition specifies the order and type of fields within a data type. A message definition exists for each unique message type of the application and is given a unique message identifier. The message definition specifies the order and types of field within a message. A message contains one or more data types. The scripts, e.g., are executable Java scripts and operate on one or more of the data types. The arrival and processing of a message triggers the processing of a script. The script, e.g., has access to the data contained within the message. And, script association to a message is specified by an application developer.

The following exemplary data type, referred to as a simple data type, simple data, contains two fields, an integer and a string. Here, the simple data comprises:

```
<data name="SimpleData" key="intField">
    <field name="intField" type="int"> ....some data...</field>
    <field name="stringField" type="string"> ....some data...</field>
</data>
```

All of the data of the simple data type are contained in a collection belonging to the application. When a simple data component is inserted into the collection, the key, which is specified as the field "intField" for this type is used to determine if an existing component in the collection should be updated, or if the component is new.

Another example simple message is shown as follows:

```
<message name="SimpleMessage">
    <field name="simpleDataField" type="SimpleData"> ....some data...</field>
</message>
```

The message definition also preferably specifies if the background processing property has been set. In this exemplary embodiment, the background processing property is relevant only if the message is a notification. In this example, the definition is extended to:

```
<message name="SimpleMessage" BackgroundProcessing="true">
    <field name="simpleDataField" type="SimpleData"> ....some data...</field>
</message>
```

A simple script, referred to as SimpleScript is associated with the simple message. Upon processing of the simple message, the SimpleScript also is executed. The SimpleScript performs, e.g., some data operation, displays the data within the message to an end user, or requests some other input. During processing of messages, data updates from messages, including notifications, occur in the same manner in both the foreground and background modes by which the mobile station is operable. The presence of a particular data type in the message indicates how mapping from the message data to the application data should take place. Using the example of the simple message, when the field of type SimpleData is read from the message, the component is stored automatically into the collection of SimpleData types at the application. If the key of the component in the message matches an existing key in the collection, the component in the collection is updated. Otherwise, the component from the message is added as a new component to the collection. The application data store 114 contains the saved data of the application.

The application message store indicates two queues, the foreground queue 126 and the background queue 128. When an application is running, only messages from the foreground queue are processed. When the application is closed, only messages from the background queue 128 are processed. The message router 118 of the application message store routes every incoming message, here received by way of the line 122, for application to the appropriate queue 126 or 128, based upon the state of the application and the background processing property of the notification messages. The message router is made aware of the state of the application by the run time of the application. And, the run time environment notifies the message router 118 when the application 12 is started or closed.

Each incoming message to the device contains an application identification and a message identification. The communication layer 124 uses the application identification to place the message in the appropriate message store 116 where it is picked up by the message router 118. If the application is running, the message is routed to the foreground queue 126. But, if the application is closed, the message router 118 uses the message identification to obtain the appropriate message definition from the definition store 112. If the message definition indicates that the background processing property has been set for the message, the notification is routed to the background queue. Otherwise, the notification is routed to the foreground queue.

In this mode, the running application requires all of the resources for displaying the user interface, processing user events, and keeping all definitions and data in memory in addition to processing of messages and scripts.

Figure 4:
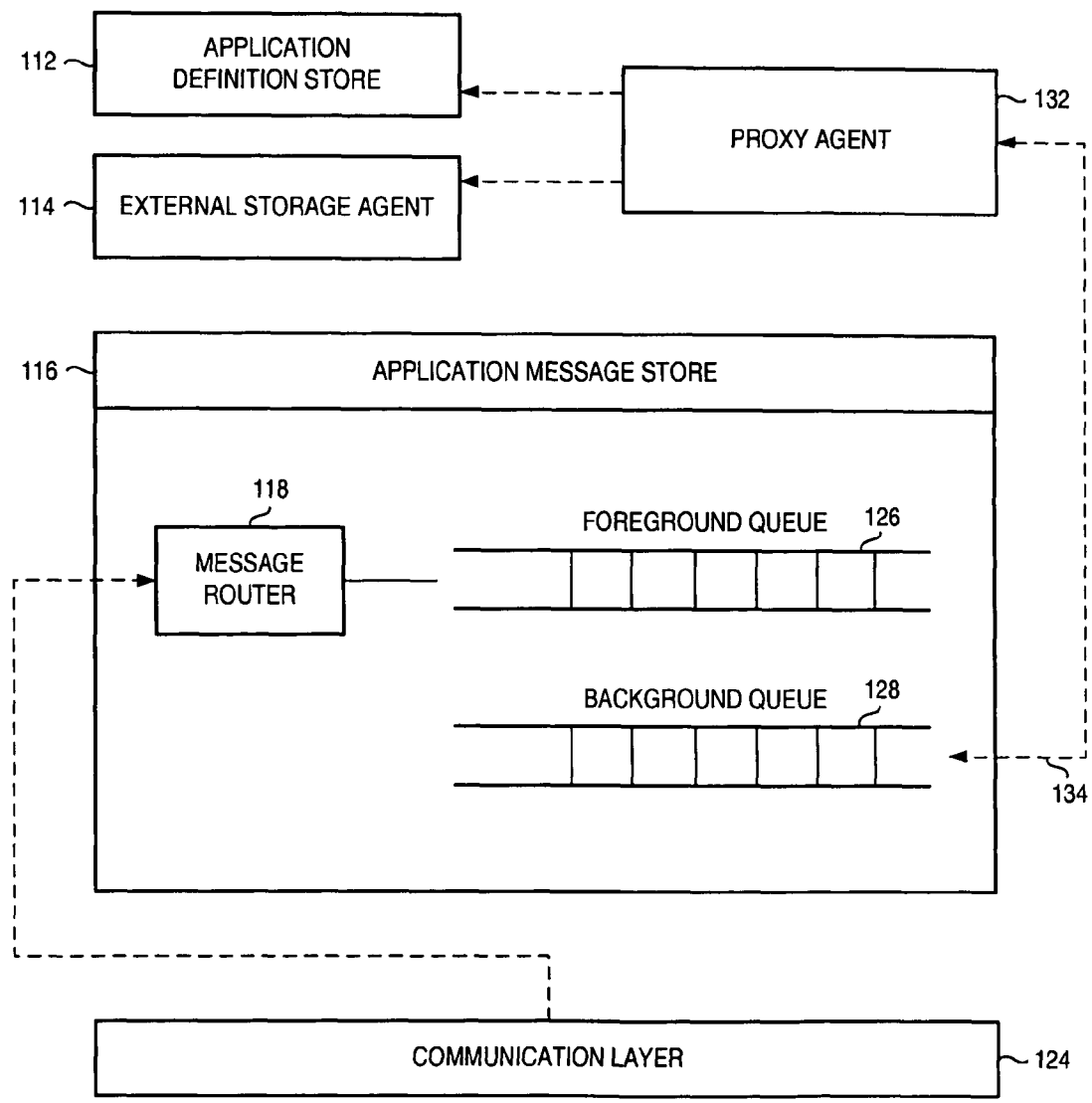
FIG. 4 illustrates a functional block diagram, similar to that shown in FIG. 3, here representative of alternate operation of an embodiment of the present invention.

FIG. 4 illustrates elements similar to those shown in FIG. 3, but here representing a push agent 132 that is coupled, here represented by way of the line 134, with the background queue 128. The push agent 132 is, in one embodiment, central to all applications and corresponds to the content operator shown in FIGS. 1 and 2. Alternately, the push agent is dedicated for a particular application. And, in an extended implementation, an application registers its custom push agent with the run time environment to handle background notifications. In this implementation, the push agent is central to all applications. The message router notifies the push agent of the new notification. The push agent takes the first message off the head of the background queue 128. And, the push agent then accesses the application definition store to obtain the appropriate message definition and any associated script. The push agent also accesses the external storage agent 114 to update and save data.

In this background operation mode, the background processor is idle and it consumes few resources when there are no background notifications to process. When required to process a notification, the background processor temporarily loads only the necessary definitions and data from the external storage agent 114.

Foreground rules permit for unrestricted script execution, including both data and user interface operations. If the application is running, but is not the application currently in use, script execution with a user interface operation requiring user input blocks, e.g., further message processing until the input is received. Background rules, in contrast, restrict executable operations from a script. For example, user interface operations cannot be executed when the application is closed. At development time, a developer is given a choice to specify two scripts to be associated with the message, one for foreground execution, and another for background execution. An alternative provides access to an application state flag in the script. UI (User Interface) operations are wrapped by the developer within a check asserting that the application is saved to the running application.

Messaging order is maintained in the background mode. The messaging protocol includes, for instance, a requirement for ordered message processing for an application. The communication layer typically contains the appropriate logic to support ordered messages at the transport level. In a foreground mode, message ordering at the application level is maintained by queuing the messages in the order received at the communication layer and processing the messages in the same order. The introduction of a background queue for processing in the background mode breaks the strict ordering.

Figure 5:
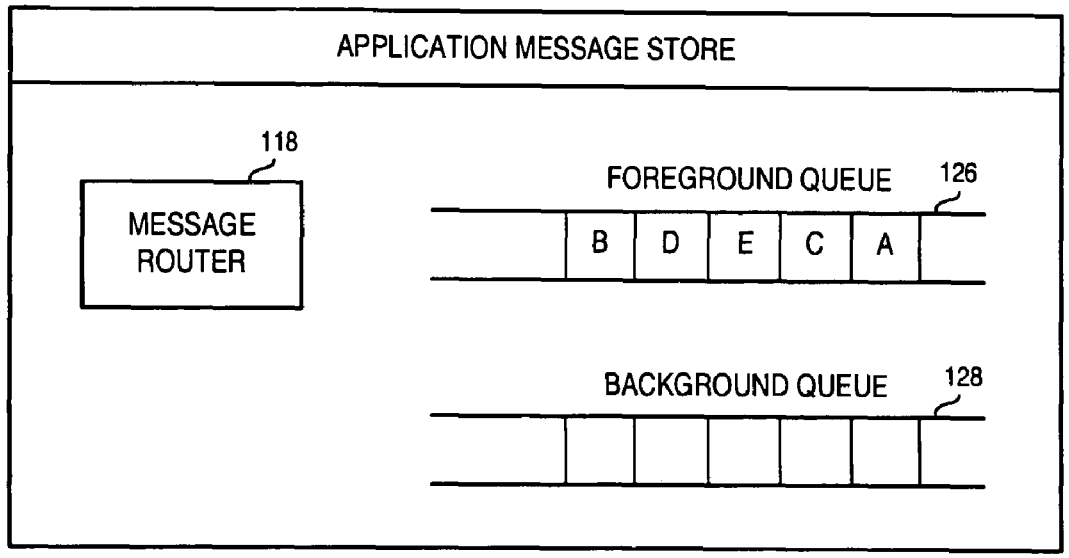
FIG. 5 illustrates a representation of a queue structure in an application message store during operation of an exemplary communication device of an embodiment of the present invention.

FIG. 5 illustrates an exemplary queue structure while the application is running. The application has messages A and B and notification messages C, D, and E. At the moment when the application is closed, the message router filters notifications with the background processing property set and reroutes the notifications to the background queues.

Figure 6:
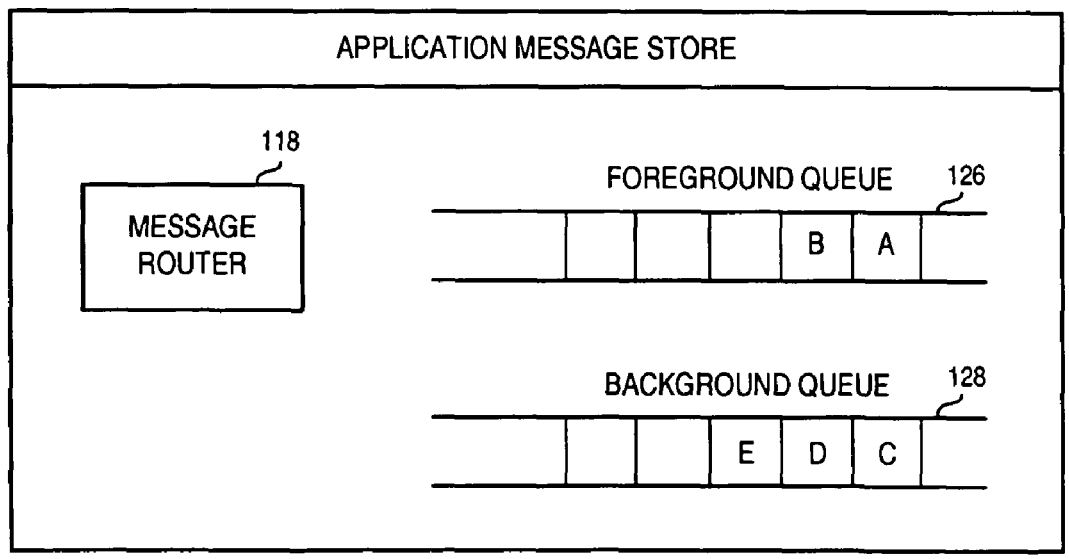
FIG. 6 illustrates a representation, similar to that shown in FIG. 4, but here representative of the queue structure when the communication device is operated in another manner.

FIG. 6 illustrates the resultant queue structure. Notifications with the background processing property set do not remain ordered with respect to non-background messages. This is implied by the nature of the property. However, all notifications with the background processing step still remain ordered with respect to each other. When the application is started, the message router once again reroutes any outstanding messages in the background to the head of the foreground queue.

Flow control is further provided. When the application is running, flow control is administered for the application as a whole. When the foreground queue size reaches a maximum threshold, all messages for the application are suspended. When the foreground queue size falls below a minimum threshold, delivery of all messages to the application are resumed.

When the application is closed, flow control is administered separately for the foreground and background queues. That is, foreground messages are suspended while background messages are delivered and vice versa. Separate thresholds for suspending and resuming the flow of foreground versus background messages can also be set.

More generally, separate foreground and background queues per application are obviated, and all of the push content is initially placed in one queue owned by the push agent. The push agent, upon taking the next message of its queue, forwards it to the appropriate application queue if the application is active. If the application is inactive, the push agent determines if it has any processing rules for this message defined in any manner, contained within the message or defined statically the message definition. If the push agent has processing rules, it processes the push content and updates the store. If not, it forwards the message to the appropriate application. A message router is placeable with the push agent and described as the computator that decides whether to forward the messages.

Figure 7:
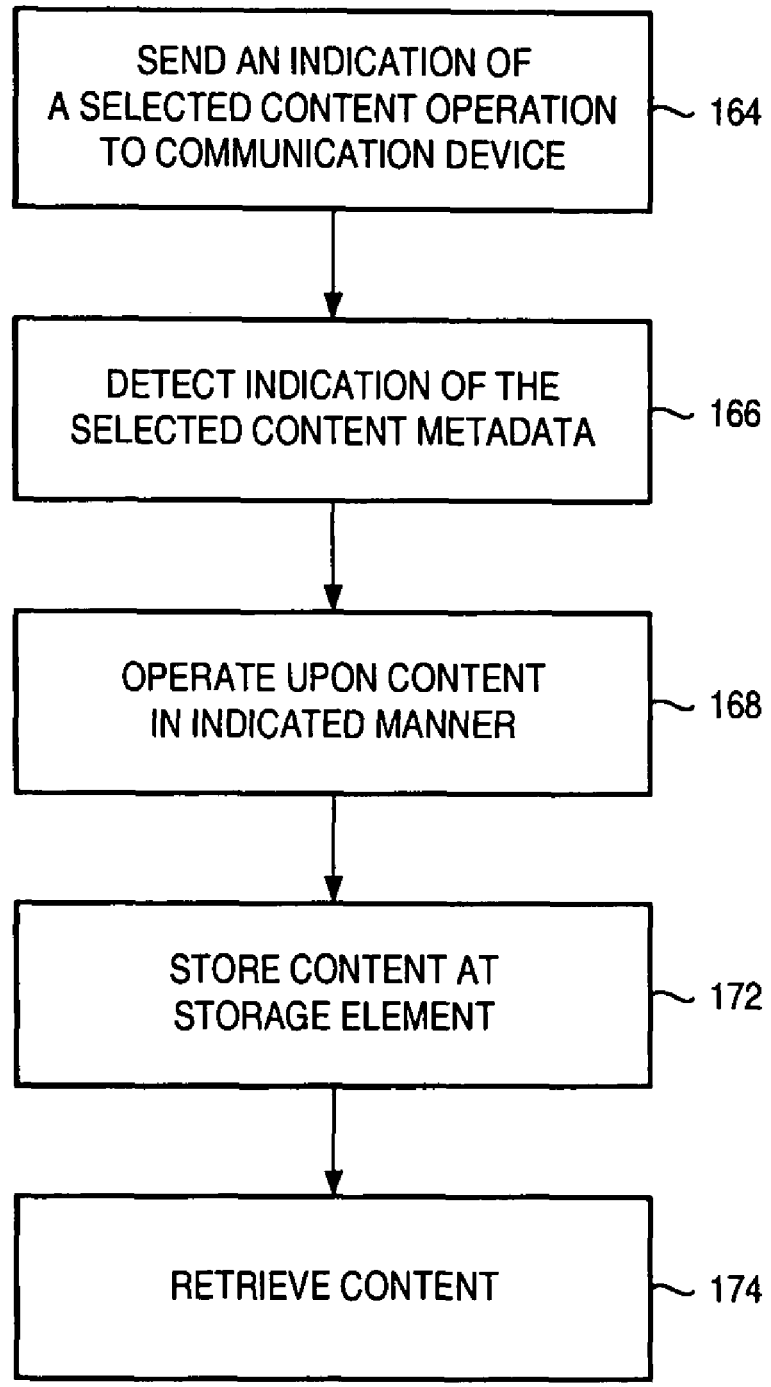
FIG. 7 illustrates a method flow diagram listing the method of operation of an embodiment of the present invention.

FIG. 7 illustrates a method, shown generally at 162, representative of the method of operation of an embodiment of the present invention. The method is for utilizing push content at a communication device operable pursuant to a push content communication scheme.

First, and as indicated by the block 164, a mobile station sends to the communication device, an indication of a selected content operation. Then, and as indicated by the block 166, an indication of content metadata is detected.

Then, and as indicated by the block 168, the content is operated upon in the instructed manner as a background operation. Once the content is operated upon, the content is stored, indicated by the block 172, at a storage element. And, as indicated by the block 174, the mobile station retrieves the content stored at the storage element.

The previous descriptions are of preferred examples for implementing the invention, and the scope of the invention should not necessarily be limited by this description. The scope of the present invention is defined by the following claims.

What is claimed is:

1. Apparatus for a receiving communication device operable pursuant to a push content communication scheme, said apparatus comprising:
   a content operator configured to receive content associated with an application, the content communicated pursuant to the push content communication scheme, the content including content processing metadata embedded therein, said content operator configured to operate upon the content in an instructed manner as a background operation;
   an instruction detector adapted to receive an indication of the content processing metadata embedded within the content, the content processing metadata comprising rules defining the instructed manner by which said content operator is to operate upon the content, said instruction detector configured to instruct said content operator of the instructed manner upon which to operate upon the content; and
   a storage element configured to store the content, once operated upon as the background operation by said content operator and prior to said application becoming active.

2. The apparatus of claim 1 wherein said content operator is embodied at a first network device.

3. The apparatus of claim 2 wherein said storage element further comprises an embodiment at the first network device.

4. The apparatus of claim 1 wherein the content processing metadata is originated in conjunction with the application.

5. The apparatus of claim 4 wherein the push content communication scheme pushes content to a mobile station, and wherein the application, with which the content operated upon by said content operator is associated, is resident at the mobile station.

6. The apparatus of claim 5 wherein the content processing metadata detected by said instruction detector is originated at the mobile station.

7. The apparatus of claim 1 wherein said instruction detector detects the content processing metadata directly from the indication of the content processing metadata.

8. The apparatus of claim 7 wherein the indication of the content processing metadata comprises an XML, Extensible Mark-up Language, message.

9. The apparatus of claim 7 wherein the indication of the content processing metadata comprises a binary message encapsulated in an XML, Extensible Mark-up Language, message.

10. The apparatus of claim 1 wherein said content operator and said instruction detector comprise parts of a network-positioned proxy server.

11. The apparatus of claim 1 wherein the communication device comprises a first network station connected to a communication network, the communication network having a second network station connected thereto, said storage element embodied at the second network station.

12. The apparatus of claim 1 wherein the push content communication scheme pushes content to a mobile station, and wherein the content, once stored at said storage element, is accessible by the mobile station.

13. The apparatus of claim 1 wherein the indication of the content processing metadata detected by said instruction detector comprises a mobile-station-originated selected content operation.

14. A method for utilizing content at a receiving communication device operable pursuant to a push content communication scheme, said method comprising the operations of:
 detecting an indication of content processing metadata embedded within the content, the content processing metadata including rules that define an instructed manner by which to operate upon the content, the content associated with an application; and
 operating upon the content in the instructed manner, defined by the content processing metadata embedded within the content, as a background operation; and
 storing the content at a storage element once operated upon as the background operation and prior to the associated application becoming active.

15. The method of claim 14 further comprising the operation, prior to said operation of detecting, of sending, from a mobile station to the communication device, the indication of the content processing metadata.

16. The method of claim 15 wherein said operation of detecting comprises detecting the content processing metadata directly from the indication of the content processing metadata.

17. The method of claim 14 wherein said operation of operating upon is performed at a first network station, wherein said operation of storing is performed at a second network location, said method further comprising the operation of transporting the content from the first network station to the second network station.

18. The method of claim 14 further comprising the operation of retrieving, by a mobile station, the content stored at the storage element.

* * * * *